Patented Nov. 21, 1950

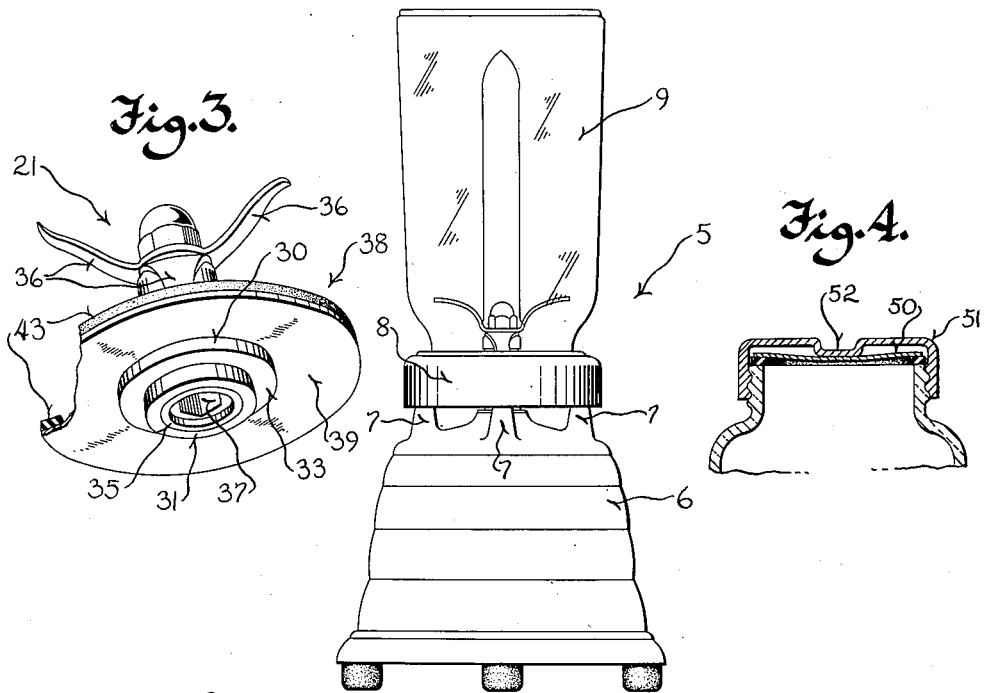
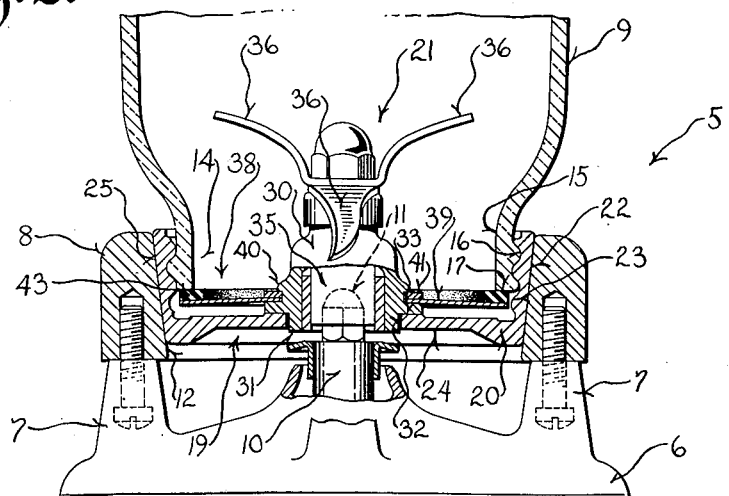

2,530,455

UNITED STATES PATENT OFFICE 2,530,455

MIXING DEVICE

Fritz Victor Forss, Racine, Wis., assignor to John Oster Manufacturing Company, Racine, Wis., a corporation of Wisconsin Application April 23, 1948, Serial No. 22,889

4 Claims. (Cl. 259—108)

This invention relates to mixing devices and has more particular reference to mixers of the type used for "liquifying" foods as well as for mixing beverages. Such mixers have an electric motor supported in their base with a driver on the motor shaft projecting upwardly to the exterior of the base and adapted to be drivingly coupled with an agitator in the bottom of a mixing vessel supported on the base. The mixing vessel is frequently open at both ends, that is, at its top and bottom, and the agitator for mixing or liquifying foods is carried by a detachable cover which closes the bottom of the mixing vessel.

The mixing vessel of mixers of the nature described is supported in an upright condition by an annular holder fixed to the top of the mixer base and encircling the driver. This ring has a bore, the wall of which tapers slightly toward a minimum diameter adjacent to the top of the base, and the exterior of the side wall of the cover for the mixing vessel is provided with a similar taper to insure centering of the vessel on the base.

It is highly important in mixers of the type here concerned, that a liquid-proof joint be established between the cover and the bottom of the mixing vessel to prevent liquids leaking from the bottom of the vessel in an annoying and extremely objectionable manner during use of the mixer. Also, it is essential that the driving socket of the cover carried agitator be held in true alignment with the driver on the motor shaft by the centering action of the annular holder when the vessel is in a position of use.

Inasmuch as the mixing vessels are usually made of relatively heavy glass, however, the rim on the threaded neck at the bottom of the vessel seldom presents a flat surface or one lying in a plane exactly perpendicular to the axis of the screw threads on the neck. Such irregularities of the rim render it extremely difficult to achieve either a leak-proof joint at the bottom of the vessel, or coaxiality between the agitator carried by the cover and the driver on the motor shaft. It will be readily appreciated that tightening of the cover onto a rim whose surface is slightly out of normal will cause tilting or cocking of the cover an extent such as to bring about a serious degree of misalignment between the driving socket of the agitator carried by the cover and the driver on the motor shaft when the vessel is placed in mixing position.

Also, where sealing is effected by a sealing member lying against the bottom of the cover and directly pressed onto the rim of the vessel by the cover, the sealing member is seldom engaged with the rim on the neck of the vessel with uniform pressure along the entire surface of the rim. This objectionable condition is likewise found to exist in the covers for ordinary fruit jars, and appears to be the cause of considerable spoilage of home canned goods.

With these objections to past constructions in mind it is an object of the present invention to provide a mixing device of the character described featuring a combined closure and agitator which when secured in place on the bottom of a mixer vessel will not only assure positive sealing of the opening in the bottom of the vessel but will also assure alignment between the agitator shaft and the driver on the motor shaft.

Another object of this invention resides in the provision of a closure unit including a resilient sealing disc, and a pressure applying member for detachably securing the closure unit in place on the neck defining the open end of a vessel and for applying a localized force onto the disc at a central area thereof to cause resilient seating of the marginal edge portions of the disc on the rim of said neck with substantially uniform pressure at all areas of the rim.

A further object of this invention resides in the provision of improved sealing means which may be used with a wide variety of vessels.

More specifically it is an object of this invention to provide an improved closure for mixing vessels of the character described, incorporating an agitator assembly having sealing means independent of the cover for engagement with the rim on the threaded neck of the vessel to seal the joint between the cover and vessel.

Another object of this invention resides in the provision of a closure unit for a mixing vessel of the character described having a readily detachable agitator assembly which includes seal means movable relatively to the cover and the agitator assembly to preclude misalignment between the agitator shaft and the driver on the motor shaft by irregularities in the rim with which the seal means engages when in place on the vessel.

With the above and other objects in view, which will appear as the description proceeds, this invention resides in the novel construction, combination and arrangement of parts substantially as hereinafter described and more particularly defined by the appended claims, it being understood that such changes in the precise embodiment of the hereindisclosed invention may be made as come within the scope of the claims.

The accompanying drawing illustrates one complete example of the physical embodiment of the invention constructed according to the best mode so far devised for the practical application of the principles thereof, and in which:

Figure 1 is a side elevational view of a mixing device of the type to which this invention pertains;

Figure 2 is an enlarged longitudinal sectional view through a portion of the device and illustrating the application of this invention thereto;

Figure 3 is a perspective view showing the agitator assembly and the sealing means carried thereby detached from the cover, and looking at the underside of the sealing means; and Figure 4 is a longitudinal sectional view through a conventional fruit jar showing a sealing closure embodying the principles of this invention applied thereto.

Referring more particularly to the accompanying drawing, the numeral 5 generally designates a mixing device of the type having a base 6 which serves to house an electric motor (not shown).

A plurality of feet 7 on the top of the base have an annular holder 8 connected thereto. The holder 8 is adapted to receive the lower end of the mixing vessel 9 to support and locate the same on the base in an upright position for mixing of the food materials placed in the interior of the vessel.

The motor shaft 10 projects upwardly through a hole in the top of the base centrally of the annular holder 8 and has a driver 11 on its upper extremity. The inner wall of the annular holder 8 is tapered as at 12 to a minimum diameter adjacent to the top of the base for a purpose to be shortly described.

In mixing devices of the type herein concerned, the mixing vessel 9 is usually made of relatively heavy glass, and has an opening 14 leading through a neck 15 at the bottom of the vessel. Screw threads 16 are cast on the exterior of the neck and the rim 17 of the neck is formed as flat and as nearly normal to the axis of the threads 16 as possible.

It is an established fact, however, that the rims on glass vessels seldom lie in planes exactly normal to the axes of their screw threaded necks, nor are they free from slight surface irregularities. These common deficiencies of glass vessels render it extremely difficult to provide a liquid-tight seal between conventional covers for the vessels and their threaded necks. Moreover, in the case of mixing vessels of the type shown, irregularities of the rim on the neck of the vessel very often lead to serious misalignment between the cover carried agitator and the driver on the motor shaft.

The closure 19 of the present invention, however, is designed to not only effect a liquid-tight joint between it and the threaded neck 15 of the mixing vessel but to also assure coaxiality between the shaft of its agitator assembly 21 and the driver 11 on the motor shaft.

Accordingly, the closure unit includes a cup-shaped cover 20 having an annular side wall 22 provided with screw threads 23 on its interior surface and an end wall 24 closing the bottom of the cup. The exterior surface of the side wall 22 is formed with a taper 25 corresponding to that on the interior wall of the annular holder 8 to provide a secure self centering connection between the base and the mixing vessel when the cover is threaded onto the neck 15 thereof.

The agitator assembly 21 comprises a bearing member 30 having a pilot 31 of a size to be readily inserted into and withdrawn from a central aperture 32 in the end wall 24 of the cover. Insertion of the pilot 31 into the aperture 32, however, is limited by an annular flange 33 on the bearing member 30 which flatwise engages the inner surface of the end wall 24 on the cover. Since the underside of the flange 33 presents a surface normal to the axis of the bearing member, the flange and pilot 31 cooperate with the end wall 24 of the cover and with one another to hold the bearing member 30 centrally of the cover and coaxial with the screw threads 23 on the side wall of the cover.

The agitator shaft 35 is carried by the bearing member 30 for rotation on the axis of the latter and consequently on the axis of the screw threads 23. Mixing blades 36 are fixed to the end of the agitator shaft projecting from the upper end of the bearing element so as to be located inside the mixing vessel when the cover is in place thereon, and the lower end of the shaft is provided with a driving socket 37 readily accessible at the underside of the cover.

When the closure unit is inserted into the annular holder 8, therefore, the cooperating tapered wall surfaces on the holder and cover center the latter and bring the axis of the agitator shaft into exact alignment with the axis of the motor shaft to allow the driver 11 on the motor shaft to become automatically coupled with the agitator shaft by entrance into the driving socket 37 thereof.

The agitator assembly 21 also carries sealing means 38 to effect a positive liquid-tight joint between the cover and the rim on the threaded neck 15 of the vessel when the cover is threaded thereonto. This sealing means includes a ring-like gasket 43, and a relatively thin, resilient spring disc 39 by which the gasket is adapted to be pressed against the rim 17 on the neck of the vessel.

The disc 39 encircles the bearing element 30 with the central portion of the disc received flatwise on the top surface of the annular flange 33, and it is securely held against the flange 33 and in a position substantially normal to the axis of the bearing member by peening over a portion 40 on the side wall of the bearing member against a washer 41 resting on the top side of the disc, so that the inner portions of the disc are confined between the washer 41 and the flange 33 of the bearing member 30.

When the cover is threaded onto the neck 17 of the vessel the end wall 24 of the cover is drawn toward the rim 17 and applies an inward force on the central portions of the spring disc through the flange 33, to yieldingly press the gasket 43 into secure sealing engagement with the rim.

One of the most important advantages of this invention results from the fact that the outer portions of the seal means are spaced from the end wall of the cover. Hence, the outer portions of the spring disc 39 are free to yield in a non-uniform manner due to unevenness of the surface of rim 17 without effecting tilting or cocking of the cover and consequently the agitator shaft.

In this respect it is to be observed that the bearing member 30 and its agitator shaft are at all times readily detachably held by the cover in coaxial relationship to the screw threads 23 on the side wall of the cover and hence coaxial with the motor shaft 10. This is possible since the sealing disc is yieldable relative to both the bearing member and the cover.

It will also be apparent that the gasket 43, which is preferably formed of rubber or an equivalent material having a degree of elasticity, will be firmly pressed against the rim with substantially uniform pressure throughout the entire area of the rim by the resilient disc 39 even though the surface of the rim may be irregular. This precludes leakage at the bottom of the vessel when in use.

When used to seal the mouth of an ordinary vessel, an imperforate sealing disc 50 without the agitator assembly is employed, and the cover 51 is preferably provided with an inward protrusion 52 engageable with the central portion of the disc to cause the marginal portions of the disc to be yieldingly engaged with the rim on the jar.

From the foregoing description taken in connection with the accompanying drawing, it will be readily apparent to those skilled in the art that the closure unit of this invention overcomes the objections attending the use of past vessels of the character described, and that the cleaning of the cover and agitator parts is greatly facilitated by the detachable connection between them.

What I claim as my invention is:

1. In a mixing device having a mixing vessel provided with an opening leading through an externally threaded neck, a combined agitator and closure for said vessel comprising the combination of: a cup-shaped cover having an annular side wall provided with screw threads on its interior for cooperation with the threads on the neck of the vessel, and having an end wall; an agitator assembly including an elongated bearing element, a shaft rotatably carried by said bearing element and having agitator blades thereon adjacent to one end of the bearing element and a driving socket adjacent to the opposite end of the bearing element, and cooperating means on the end wall of the cover and the bearing element for readily detachably mounting said agitator assembly on the inside of the cover with the agitator shaft coaxial with said threads on the cover and with the driving socket of the agitator shaft accessible from the exterior of the cover through an aperture in the end wall of the cover; and a sealing member carried by said bearing element for engagement with the rim on said neck of the mixing vessel to seal the joint between the cover and said neck upon tightening of the cover on the neck.

2. In a mixing device having a mixing vessel provided with an opening leading through an externally threaded neck, a combined agitator and closure for said vessel comprising the combination of: a cup-shaped cover having screw threads on the interior surface of its side wall cooperable with the threads on the neck of the vessel, and having an end wall; an agitator assembly including an elongated bearing element, and a shaft rotatably carried by said bearing element and having agitator blades thereon adjacent to one end of the bearing element and a driving socket adjacent to the other end of the bearing element; means for readily detachably mounting said agitator assembly on the inside of the cover with the agitator shaft coaxial with the threads of the cover and with the driving socket of the agitator shaft accessible from the exterior of the cover through an aperture in said end wall of the cover, said means including a pilot projecting from said other end of the bearing element and removably received in said aperture in the end wall of the cover; and sealing means fixed to said bearing element and adapted to be engaged with the rim on said neck of the vessel to seal the joint between the cover and said neck upon tightening of the cover on the neck.

3. In a mixing device having a mixing vessel provided with an opening leading through an externally threaded neck: a cup-shaped cover for closing said opening, said cover having screw threads on the interior surface of its side wall cooperable with the screw threads on the neck of the vessel, and having an end wall the inner surface of which is substantially normal to the axis of the cover threads; sealing means inside the cover adapted for engagement with the rim on said neck of the vessel to seal the joint between the cover and vessel; and means for readily detachably connecting said sealing means with the cover including a part flatwise engaged with the inner surface of said end wall and having a pilot projecting therefrom into a central aperture in said end wall of the cover to preclude lateral shifting of said part, and a disc of resilient material fixed to said part and lying between it and said sealing means.

4. In a mixing device of the type having a mixing vessel provided with an opening leading through an externally threaded neck: a cup-shaped cover for closing said opening, said cover having an annular side wall provided with threads on its inner surface for cooperation with the threads on said neck of the vessel, and having an end wall the inner surface of which is substantially normal to the axis of the screw threads on said side wall, said end wall having a central aperture therethrough; elongated bearing means including a pilot on one end of the bearing means projecting into said aperture of the cover end wall from the inside of the cover, and an annular flange engaging over the inner surface of said cover end wall adjacent to the aperture therein and cooperating with the pilot to hold the bearing means centrally of the cover at the inside thereof and coaxial with the screw threads on the side wall of the cover; a shaft rotatably carried by said bearing means and having agitator blades adjacent to the opposite end of the bearing means, and a driving socket adjacent to the pilot end of said bearing means and accessible from the exterior of the cover; and a centrally apertured sealing disc having its outer marginal edge portions engaged with the rim on the neck of the vessel and its inner marginal edge portions engaged over said flange on the bearing means so that tightening of the cover onto the neck of the vessel causes said flange to be tightly clamped between the end wall of the cover and the disc and causes the outer marginal edge portions of the disc to be pressed firmly into sealing engagement with the rim on the neck of the vessel.

FRITZ VICTOR FORSS.

REFERENCES CITED

The following references are of record in the file of this patent:

UNITED STATES PATENTS

| Number | Name | Date |
|---|---|---|
| 2,253,023 | Fabrice | Aug. 19, 1941 |
| 2,278,125 | Landgraf | Mar. 31, 1942 |
| 2,284,155 | Landgraf | May 26, 1942 |
| 2,319,849 | Crabbe | May 25, 1943 |